INVENTOR.
EDWARD C. HANNA
BY
YOUNT, FLYNN, & TAROLLI

ATTORNEYS

INVENTOR.
EDWARD C. HANNA
BY
YOUNT, FLYNN, & TAROLLI

ATTORNEYS

INVENTOR.
EDWARD C. HANNA
BY
YOUNT, FLYNN, & TAROLLI

ATTORNEYS

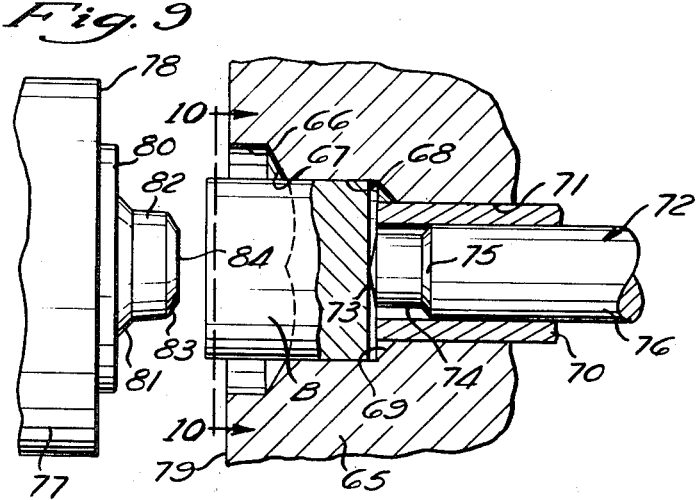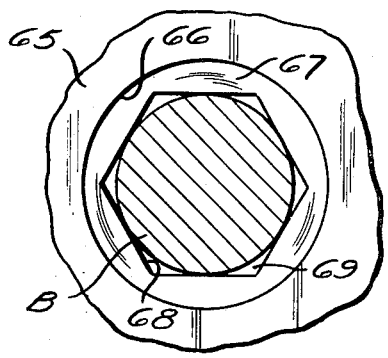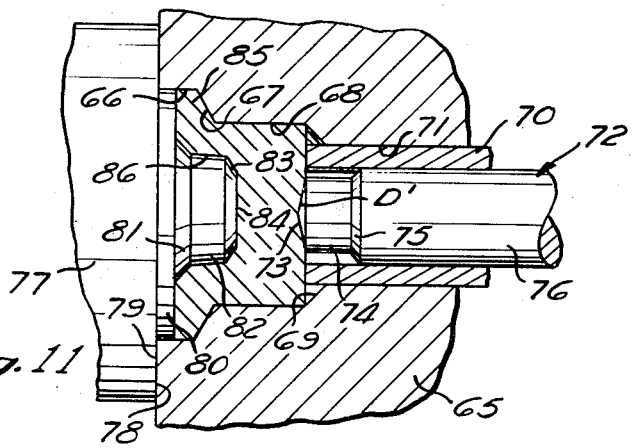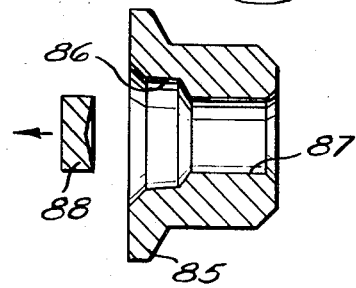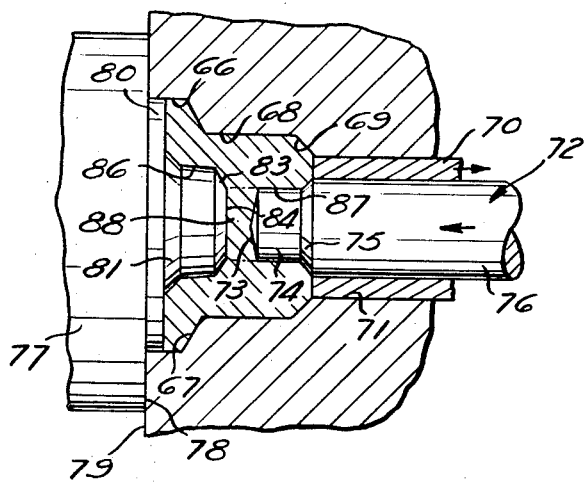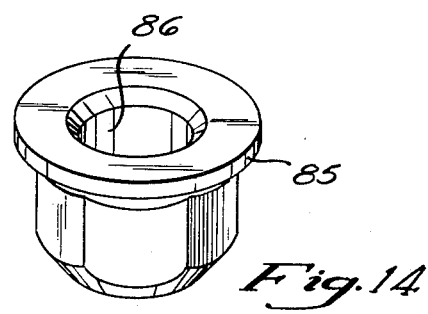

United States Patent Office 3,540,255
Patented Nov. 17, 1970

3,540,255
METHOD AND APPARATUS FOR MAKING HOLLOW METAL ARTICLES
Edward C. Hanna, Strongsville, Ohio, assignor to The Lamson & Sessions Co., Cleveland, Ohio, a corporation of Ohio
Filed Dec. 13, 1967, Ser. No. 690,138
Int. Cl. B21c 23/00
U.S. Cl. 72—256      20 Claims

ABSTRACT OF THE DISCLOSURE

In the present method and apparatus, a solid cylindrical metal blank is deformed diametrically outward to tightly fit a die cavity by a tool moving against the die while the inner end of the die cavity is closed by a fixedly held extrusion punch and a sleeve surrounding the punch. Following this, while the tool is held against the die and the sleeve is released, the extrusion punch is driven forward into the blank and the backward extrusion of the blank material along the punch pushes the sleeve rearward. After the tool is retracted away from the die, the sleeve is then driven forward to strip the extruded blank off the punch and out of the die cavity. Preferably, the tool which moves against the die coacts with it to form a laterally projecting flange on the outer end of the blank.

---

This invention relates to a method and apparatus for making hollow metal articles.

One of the disadvantages inherent in the manufacture of hollow metal articles in a multiple-die machine arises from the necessity of providing a clearance between the workpiece or blank and each successive die cavity into which it is slidably inserted. Such a clearance is necessary for the easy insertion of the blank into the die cavity, but it creates the possibility that the blank may not be properly centered within the die cavity. Consequently, the finished article may be unsatisfactory because of excessive eccentricities. Also, the life of an extrusion punch acting on an improperly positioned blank can be greatly shortened because of excessive transverse stresses imposed upon it.

The present invention is directed to a novel and advantageous method and apparatus in which a hollow metal article is completely formed, at least insofar as its critical contours and dimensions are concerned, in a single die cavity in a novel manner which avoids the foregoing disadvantages. The present invention is particularly advantageous for the manufacture of flanged metal articles, such as flanged rivets or flanged nuts, and the following detailed description of two presently-preferred embodiments of the invention is directed to the manufacture of such articles. However, it is to be understood that the present invention may also be used advantageously in the manufacture of hollow metal articles, particularly articles with polygonal sides, which may not be flanged.

It is a principal object of this invention to provide a novel and improved method of making a hollow metal article whose critical contours and dimensions are completely formed in a single die cavity.

Another object of this invention is to provide such a method having novel provision for insuring that the blank is properly centered in the die cavity while it is being deformed to provide the critical contours and dimensions of the finished article.

Another object of this invention is to provide a novel and improved method of making in a single die during a single machine stroke a hollow metal article having a central hole whose length-to-diameter ratio may be substantially greater than was feasible heretofore in a single die operation.

Another object of this invention is to provide a novel and improved method of making a flanged hollow metal article.

Another object of this invention is to provide a novel and improved method of making a hollow metal article having polygonal sides from a solid cylindrical metal blank in a single die during a single machine stroke.

Another important object of this invention is to provide a novel and improved apparatus for making a hollow metal article whose critical contours and dimensions are completely formed in a single die cavity.

Another object of this invention is to provide such an apparatus having novel provision for insuring that the blank is properly positioned in the die cavity while it is being deformed to provide the critical contours and dimensions of the finished article.

Another object of this invention is to provide a novel and improved apparatus for making in a single die during a single machine stroke a hollow metal article having an extruded central hole whose length-to-diameter ratio may be substantially greater than was feasible heretofore in a single die operation.

Another object of this invention is to provide such a novel and improved apparatus for making a flanged hollow metal article.

Another object of this invention is to provide a novel and improved apparatus for making a hollow metal article having polygonal sides from a solid cylindrical metal blank in a single die during a single machine stroke.

Further objects and advantages of the present invention will be apparent from the following detailed description of two presently-preferred embodiments, which are illustrated in the accompanying drawings.

In the drawings:

FIG. 9 is a view showing partly in side elevation and partly in longitudinal section a tool and die assembly for making a flanged hexagonal nut in accordance with the present invention, with the parts being shown in their respective positions after the blank is inserted in the die cavity and before the heading tool is driven against the blank;

FIG. 10 is a cross-section through the outer end of the blank and looking into the die cavity, taken along the line 10—10 in FIG. 9;

FIG. 11 is a view similar to FIG. 9 and showing the parts in their respective positions after the tool is driven against the outer end of the blank;

FIG. 12 is a similar view showing the parts in their respective positions after the extrusion punch is driven from the inner end of the die cavity forward into the inner end of the blank;

FIG. 13 is a longitudinal section indicating schematically how the central web in the blank may be punched out following the formation of the blank as shown in FIGS. 11 and 12; and FIG. 14 is a perspective view of the finished flanged nut made by the process and apparatus of FIGS. 9–13.

Figure 1:
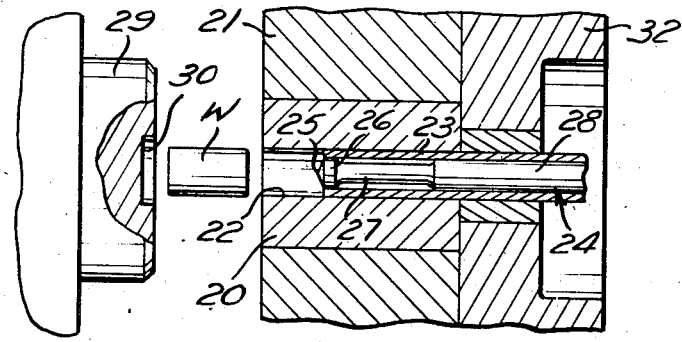
FIG. 1 is a view showing partly in side elevation and partly in longitudinal section a tool and die assembly for making a flanged hollow rivet or the like in accordance with the present invention, with the parts being in their respective positions before a blank is inserted into the die cavity.

Referring first to FIGS. 1–5, the embodiment of the invention illustrated there is constructed and arranged to produce a rivet or the like having a hollow shank with a flanged head on one end. The apparatus comprises a die 20 carried by die case 21 on a stationary die breast and having a die cavity 22 which in this instance is cylindrical. However, it is to be understood that the die cavity may be polygonal, such as hexagonal, for all or part of its length, depending upon the shank configuration desired for the finished article. A sleeve 23 is snugly, but slidably, received in the back end of the die cavity. An extrusion punch 24 is slidably mounted in the sleeve 23, presenting a conical tip 25 at its front end, a cylindrical head 26 just behind this tip which has a snug, sliding fit in the sleeve 23, a reduced diameter shank 27 behind the head, and a larger diameter section 28 behind the shank which also has a snug, sliding fit within the sleeve.

The starting blank or workpiece W is a cylindrical, solid cross-section slug which has a snug, sliding fit in the die cavity 22.

A heading tool 29 is mounted on a header slide (not shown) which is reciprocable toward and away from the die breast. This tool presents a cylindrical cavity or recess 30 at its front end which is shallow axially and is concentric with the die cavity 22 and larger in cross-sectional diameter than the latter.

Figure 2:
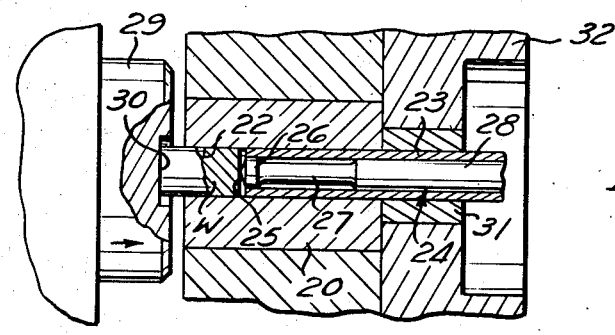
FIG. 2 is a similar view showing the parts while the tool is being forced against the die in which the blank has been inserted.

In the operation of this apparatus in accordance with the present invention, the workpiece or blank W is first inserted into the die cavity 22, with its inner end abutting against the conical tip 25 on the punch 24, as shown in FIG. 2. The front end of the sleeve 23 is spaced just slightly behind the inner end of the blank. The outer end of the blank projects beyond the front of the die 20.

Figure 3:
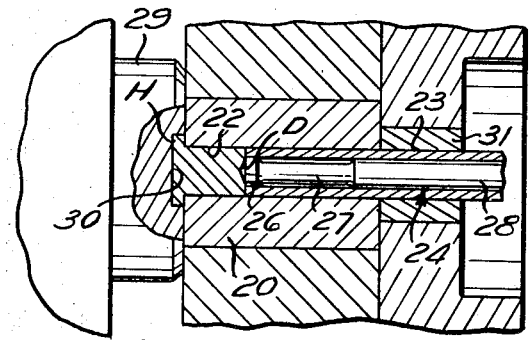
FIG. 3 is a similar view showing the parts after the tool is against the die.

With the extrusion punch 24 and the sleeve 23 held stationary in this position, as described in detail hereinafter, the heading tool 29 is moved toward the die 20 into engagement with the outer end of the blank, as shown in FIG. 2, and it continues to move forward until it abuts against the front of the die 20, as shown in FIG. 3. In doing so it causes the inner end of the blank to be compressed axially against the tip 25 of the stationary punch 24 and to be deformed diametrally outward tightly against the wall of the die cavity. The punch produces a slight conical recess or dimple D in the inner end of the blank. The front end of the sleeve 23 and the conical tip 25 on the front end of the punch together define the stationary inner end wall of the die cavity 22 to confine the blank there. Because the punch 24 is centered with respect to the die cavity by the sleeve 23 which slidably supports it, the conical dimple or recess D which the front end of the punch forms in the inner end of the blank is accurately centered with respect to the longitudinal axis of the blank. As the tool 29 moves forward toward the die, it causes the outer end of the blank to be headed or upset laterally outward to completely fill the shallow cylindrical cavity 30 in the tool 29, thereby forming an annular flange or head H on the outer end of the blank.

Next, with the tool 29 held abutting against the front of the die 20, the punch 24 is driven forward and at the same time the force which had been holding the sleeve 23 against rearward movement is removed. Consequently, the material of the blank extrudes rearwardly around the forwardly-moving punch 24 and forces the sleeve 23 rearward (FIG. 4) to form a cylindrical, hollow shank S on the blank whose outside diameter is determined by the diameter of the die cavity 22 and whose inside diameter is determined by the diameter of the cylindrical head 26 on the punch just behind its front end tip. This completes the formation of the blank.

As already stated, the previously formed dimple D in the inner end of the blank insures that the blank is properly centered with respect to the punch 24 so that when the punch is driven forward, as just described, the rearwardly-extruded cylindrical shank S has a substantially uniform wall thickness around its complete circumferential extent.

Figure 5:
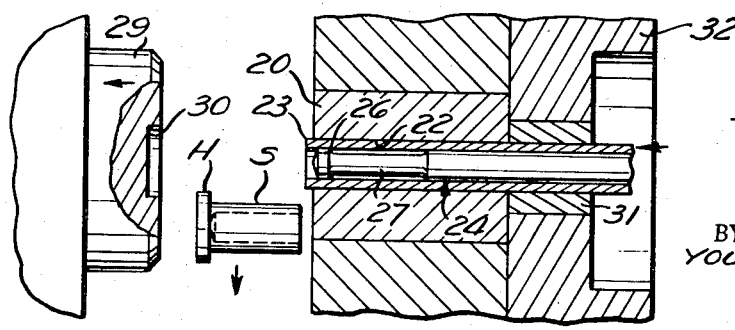
FIG. 5 is a similar view showing the parts after the stripper sleeve is driven forward from the inner end of the die cavity to strip the finished blank off the extrusion punch and out of the die cavity.

Following this, the header slide is retracted to move the tool 29 back away from the die 20, as shown in FIG. 5, and, with the punch 24 remaining stationary in its forward or extended position, the sleeve 23 is driven forward to strip the finished workpiece off the punch and out of the die cavity 22.

Figure 6:
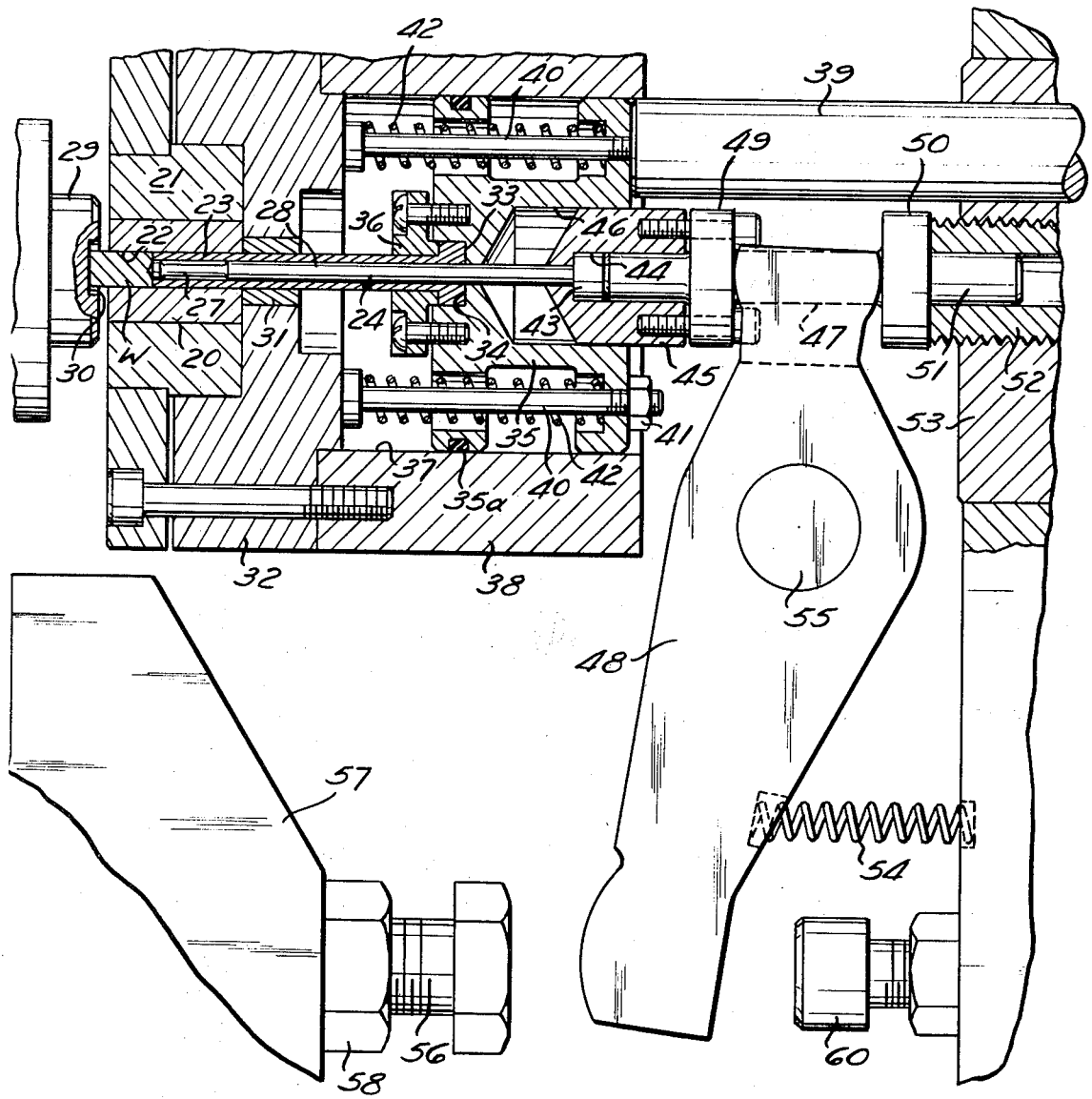
FIG. 6 is a view showing partly in elevation and partly in longitudinal section the various operating parts of the present apparatus for controlling the operation of the extrusion punch and the stripper sleeve in their respective positions while the tool is being moved against the die.
Figure 7:
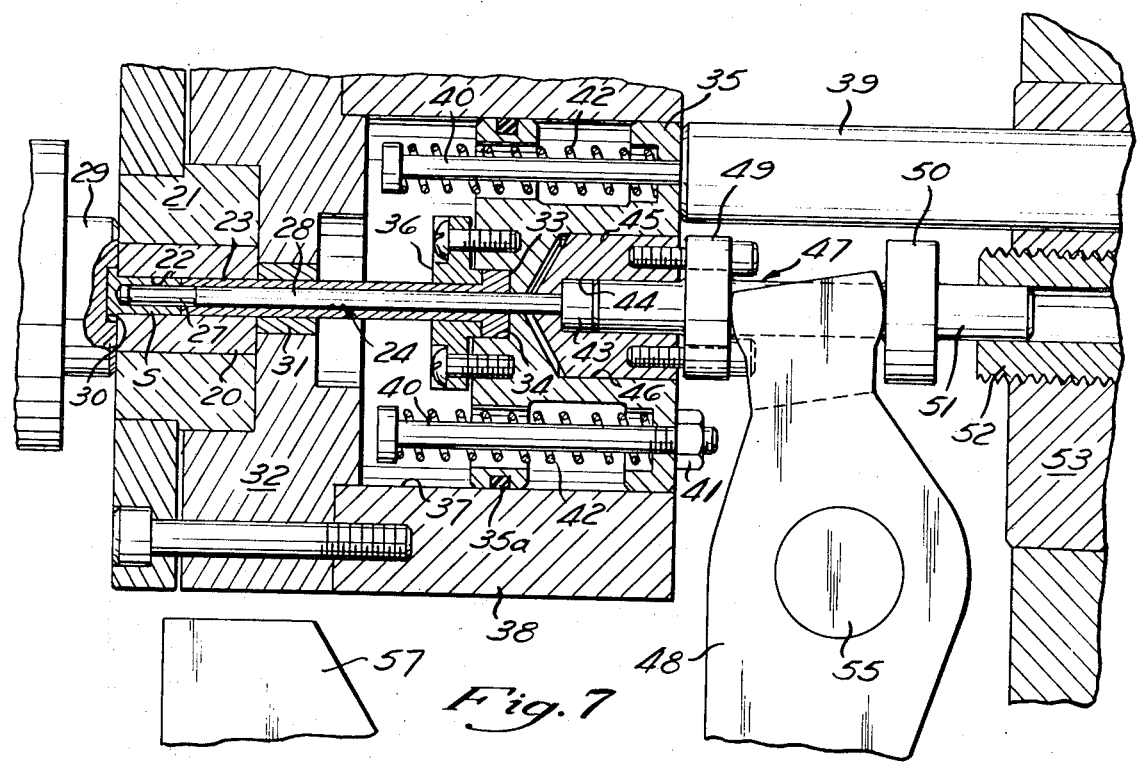
FIG. 7 is a similar view, with certain parts omitted for simplicity, showing the positions of the parts after the extrusion punch is driven forward.
Figure 8:
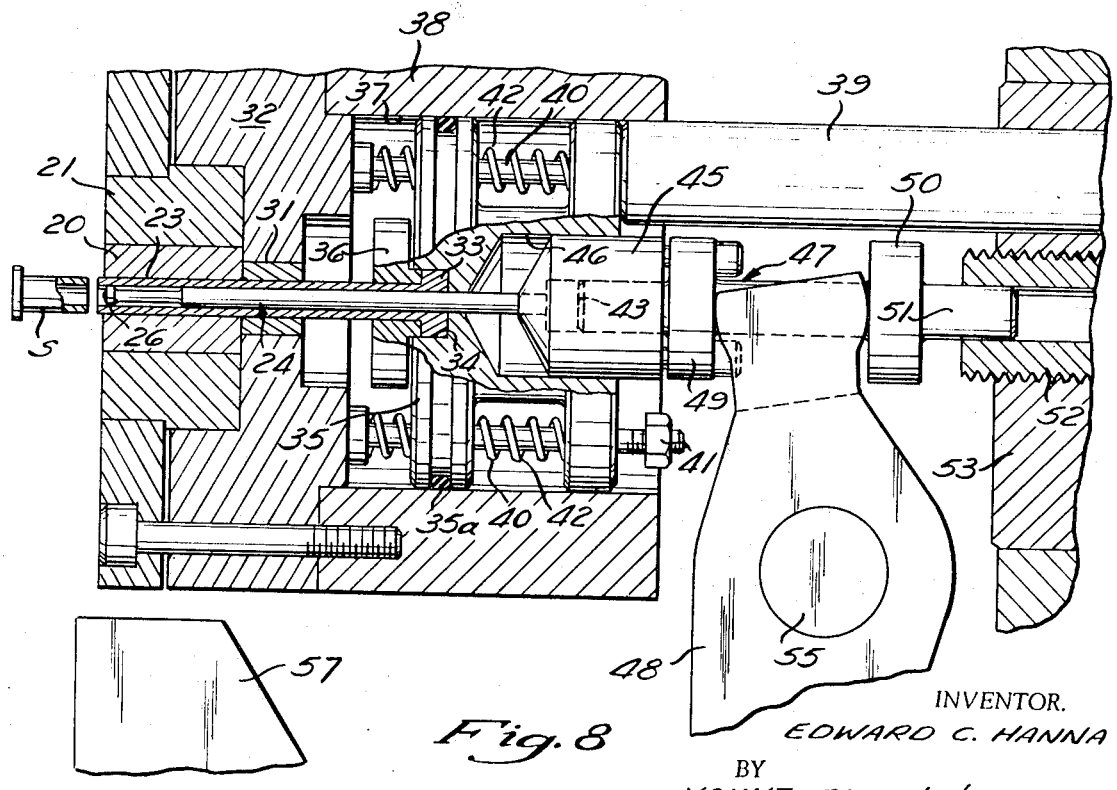
FIG. 8 is a view similar to FIG. 7 and showing the positions of the parts after the stripper sleeve is driven forward.

The mechanism for controlling the positions and movements of the punch 24 and the sleeve 23, as just described, is shown in FIGS. 6–8. Referring to FIG. 6, the sleeve 23 in the apparatus of FIGS. 1–5 is slidably supported intermediate its ends by a sleeve bearing 31 carried by the die breast 32. At its inner end the sleeve has an enlarged head 33 seated in a recess 34 in the front end of a slidable block 35 and held in place there by a plate 36 bolted to the front of the block. The block 35 is slidably mounted in a bore 37 formed in a backup plate 38 for the die breast. The block 35 carries an O-ring 35a of rubber or rubber-like material which provides frictional restraint between the block and the wall of bore 37. The back end of the sleeve-supporting block 35 is engaged by a pair of slidably reciprocable shafts 39, only one of which appears in FIG. 6, which are movable toward and away from the die breast backup plate 38 by a cam mechanism (not shown).

The slidable block 35 carries a plurality of retractable bumper pins 40, each carrying a nut 41 on its back end behind the block 35 and with a coil spring 42 engaged under compression between the block and a head on the front end of the pin. The front ends of these bumper pins 40 engage the back of the die breast 32 in the FIG. 6 position.

The punch 24 has an enlarged head 43 on its inner end which is seated in a recess 44 in a plunger 45. This plunger is slidably received in a recess 46 in the sleeve support block 35 which is open at the latter's back end. A follower 47 is bolted to the back end of plunger 45. The position of this follower is controlled by a rocker arm 48. The follower 47 presents an axially spaced pair of laterally projecting portions 49 and 50, which respectively engage the convex front and rear faces of the rocker arm at its upper end. Behind its projecting portion 50, the follower 47 has a stem 51 which is slidably received in the bore of a hollow screw 52, which is threadedly mounted in a fixed support 53.

A coil spring 54 (FIG. 6) is engaged under compression between this support 53 and the back side of the rocker arm 48 below the latter's pivot 55 so as to bias the rocker arm clockwise.

The lower end of the rocker arm is positioned for engagement at the front by the head end of a screw 56 which is clamped to a slide 57 by a nut 58. The slide 57 is reciprocable parallel to the movement of the header slide which carries the tool 29. A stop pin 60 is mounted on the support 53 for engagement by the back of the rocker arm 48 at the latter's lower end to limit the counterclockwise movement of the rocker arm.

In the operation of this mechanism, during the heading of the blank (FIGS. 2 and 3), the two shafts 39 are held part-way forward to hold the sleeve-supporting block 35 part-way forward along the recess 37 in the backup plate 38 for the die breast, as shown in FIG. 6. Consequently, the sleeve 23 is held part-way forward along the die cavity 22, as shown in FIGS. 2, 3 and 6. Also, at this time, the slide 57 is held at its extreme position to the left and the spring 54 urges the rocker arm 48 to its extreme clockwise position, in which the rear projection 50 on its follower 47 abuts against the inner end of the hollow screw 52 carried by the stationary support 53. Consequently, the punch 24 is in its fully retracted position, as shown in FIGS. 2, 3 and 6, with the conical tip 25 of the punch projecting just beyond the front end of the sleeve 23.

Figure 4:
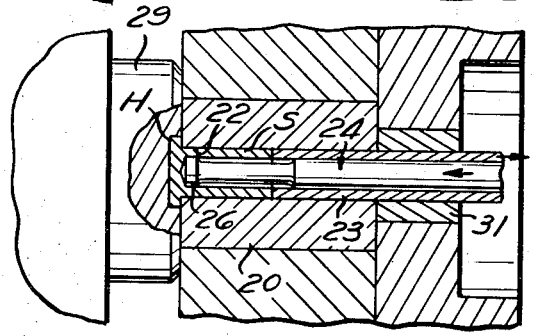
FIG. 4 is a similar view showing the parts after the extrusion punch is driven forward from the inner end of the die cavity.

Following the completion of the heading portion of the work stroke (FIG. 3) the slide 57 is moved to the right (FIG. 7) rocking the rocker arm 48 counterclockwise so as to drive the punch forward into the blank, as shown in FIG. 4. The stop pin 60 for the rocker arm limits this forward movement of the punch. At the same time, the shafts 39 are released by their cams to permit the sleeve 23 to be retracted by pressure of the backward extrusion of the blank material along the punch. This also retracts the block 35 which carries with it the bumper pins 40, to the position shown in FIG. 7.

After the punch 24 has completed its forward stroke, the slide 57 is retracted to the left, releasing the rocker arm 48. However, initially the friction between the punch 24 and the extruded shank S of the blank holds the punch in its forward position and the rocker arm in its extreme counter clockwise position. The header slide which carries the tool 29 is retracted away from the die breast, and then the shafts 39 are driven forward (FIG. 8) by their respective cams, forcing the sleeve support block 35 into the recess 37 in the die breast backup plate 38. Consequently, the sleeve 23 moves forward to strip the fully-extruded blank off the punch 24 and out of the die cavity 22, as shown in FIGS. 5 and 8.

As soon as the blank has been stripped off the punch 24, the spring 54 moves the rocker arm 48 clockwise to retract the punch to the position shown in FIGS. 2 and 6.

Atfer the blank is ejected from the die cavity, the shafts 39 are released by their respective cams, so that the compressed springs 42 can retract the sleeve-carrying block 35 until its back side strikes the nuts 41. In doing so, the spring 42 overcome the frictional restraint of the O-rings 35a. This rearward movement of the block 35 forces the shafts 39 rearwardly and retracts the sleeve 23 until the parts are back in the starting position shown in FIG. 6.

In the operation of the present invention, the starting blank W has a slight clearance in the die cavity 22 which is just sufficient to enable it to be readily inserted in the die cavity. The initial deformation of the blank takes place as the tool 29 moves against its outer end (FIG. 2), so that the blank is confined axially between this tool and the slightly protruding conical end of the punch 24. As the tool 29 continues to move forward, the blank is expanded diametrally into tight engagement with the wall of the die cavity 22 and the inner end of the blank is forced over the conical end of the punch 24, so that the latter forms a slight conical depression or dimple in the inner end of the blank, and the blank seats tightly against the inner end of the punch 24 and the inner end of the sleeve 23. The punch 24 is precisely centered within the die cavity 22 because of the support which the sleeve 23 provides for the cylindrical portion 26 of the punch just behind its conical end 25. The sleeve 23 itself is supported precisely concentric with the die cavity. Consequently, the initial depression or dimple D in the inner end of the blank is precisely centered with respect to the die cavity 22.

The continued forward movement of the tool 29 (FIG. 3) causes the outer end of the blank to be headed, that is, upset, to fill the tool recess 30.

After the outer end of the blank has been headed, the punch 24 is driven forward to cause backward extrusion of the blank along the punch.

It will be evident that, because the blank is expanded diametrally to fit tightly against the side wall of the die cavity 22, there is no possibility that during heading and extrusion the blank can be off-center or tilted with respect to the die cavity. As already explained, the initial penetration of the punch into the inner end of the blank is precisely centered. As the punch 24 is driven forward into the blank, the backwardly extruding blank material (which is of substantially uniform wall thickness because of the initial concentricity of the punch with the die cavity) itself acts as a bushing for supporting the front end of the punch beyond the sleeve 23 throughout the forward stroke of the punch. In addition to insuring that the back-extruded hole will be properly centered in the workpiece, the present invention enables the length of the back-extruded hole to be much longer than in the prior practice, where it was usually not more than 2½ times the hole diameter, as well as extending the useful life of the extrusion punch by avoiding destructive transverse forces on it. Also, the wall thickness of the extruded shank on the workpiece can be greater, for a given diameter of the extrusion punch, than was feasible heretofore.

All of the deformations of the blank which are required to produce the finished article take place while the blank is in a single die cavity and, having avoided any possible eccentricity or tilting of the blank within this die cavity, the present invention completely avoids the difficulties inherent in the manufacture of such an article in a multiple-die apparatus, where the blank would necessarily have a clearance in each die cavity initially.

Since the position of the hollow screw 52 determines the fully-retracted position of the punch 24, the length of the forward stroke of the punch (and thus the length of the extruded hollow shank of the blank) can be selectively varied by adjusting the screw 52 on the fixed support 53.

Referring to FIGS. 9–12, the tool and die assembly illustrated there is constructed and arranged to form in a single working stroke in a single die a flanged nut as shown in FIG. 14, except for the removal of a thin web from the center of the nut blank and the tapping of the central opening.

As shown in FIGS. 9 and 10, the apparatus comprises a die 65 carried by a die case on a stationary die breast (not shown). The die has a die cavity with an axially shallow, relatively large diameter, cylindrical outer end portion 66, a conical wall 67 of shorter axial extent which tapers inwardly from the inner end of the cylindrical outer end portion 66, a substantially longer hexagonal portion 68 extending inward from the inner end of the conical wall 67, and a short conical wall 69 which tapers inward from the inner end of the hexagonal portion 68.

A sleeve 70 is slidably mounted in a cylindrical passage 71 in the die which extends axially inward from the die cavity and concentric with the latter. An extrusion punch 72 is slidable in the sleeve 70, presenting a conical tip 73 at its front end, a short cylindrical portion 74 immediately behind the tip which is of smaller outside diameter than the inside diameter of the sleeve 70, a short conical portion 75 extending rearward from the cylindrical portion 74, and an elongated cylindrical portion 76 extending rearward from the conical portion and having a snug, sliding fit in the sleeve 70.

The starting blank or workpiece B is a cylindrical slug of solid cross-section, whose cylindrical outside diameter is just slightly smaller than the across-the-flats diameter of the hexagonal portion 68 of the die cavity so that the blank has a snug, sliding fit in the hexagonal portion of the die cavity, as shown in FIG. 10.

A heading tool 77 is carried by a header slide (not shown) which is mounted for reciprocation toward and away from the die breast. The tool has a flat, annular, front end face 78 for abutting engagement with the front face 79 of the die, and a forwardly-projecting cylindrical portion 80 of short axial extent which is adapted to extend part-way into the cylindrical outer end portion 66 of the die cavity with a snug, sliding fit therein. The tool has a short conical portion 81 extending forward from this cylindrical portion 80, a longer cylindrical portion 82 extending forward from the conical portion 81, and a short conical portion 83 extending forward from the cylindrical portion 82 and terminating in a flat front end face 84, which is disposed perpendicular to the direction of movement of the tool and perpendicular to the axis of the die cavity. The cylindrical portion 82 of the tool 77 is of substantially larger diameter than the cylindrical portion 74 of the extrusion punch 72.

In the operation of this apparatus in accordance with the present invention, the sleeve 70 and the punch 72 initially are fixedly held positioned as shown in FIG. 9, with the front end of the sleeve 70 being located even with the inner end of the hexagonal portion 78 of the die cavity and the conical tip 73 of the punch projecting just slightly into the hexagonal portion 78 of the die cavity. The blank B is inserted into the die cavity until its inner end engages the point on the tip of the punch. In this position, as shown in FIG. 9, the front end of the blank projects beyond the front face 79 of the die.

With the punch 72 and sleeve 70 held stationary in this position, the heading tool 77 is moved toward the die into engagement with the outer end of the blank, forcing the inner end of the blank against the protruding end 73 of the extrusion punch to form the shallow conical recess D' in the blank while the blank is being expanded diametrally into tight engagement with the flats on the hexagonal portion 68 of the die cavity and the outer end of the blank is being upset. This shallow recess or depression D' is precisely centered with respect to the die cavity because the sleeve 70 centers the extrusion punch 72 with respect to the die cavity. The heading tool 77 moves forward until its front face 78 abuts against the front face 79 of the die, as shown in FIG. 11. In doing so, it forms a central depression or recess in the blank which is shaped complementary to the projecting portions 83, 82, 81 on the tool, and it also upsets the outer end of the blank to form a laterally outwardly-projecting, cylindrical flange 85 on the blank between the projecting cylindrical portion 80 of the tool and the conical wall 67 of the die cavity. This flange abuts against the cylindrical wall 66 of the die cavity around its complete circumferential extent. The cylindrical projection 82 on the tool 77 forms a relatively deep cylindrical counterbore 86 in the blank.

During all of the foregoing operations, the sleeve 70 and the extrusion punch 72 are held stationary, closing the inner end of the die cavity.

Next, with the tool 77 held abutting against the front of the die 65, the punch 72 is driven forward into the blank and at the same time the restraining force on the sleeve 70 is removed, so that the sleeve is free to move rearward. Consequently, the blank is deformed radially outward to completely fill the corners of the hexagonal portion 78 of the die cavity and also to completely fill the conical portion 69 of the die cavity by rearward extrusion around reduced diameter portion 74 of the punch. In doing so, the back-extruded blank material forces the sleeve 70 rearward, as shown in FIG. 12. The cylindrical, reduced-diameter portion 74 of the extrusion punch 72 forms a cylindrical bore 87 in the blank which is concentric with the counterbore 86.

This leaves only an axially-short web 88 in the center of the blank between the tool and the punch which is to be removed in a subsequent piercing operation, as indicated schematically in FIG. 13.

Following the step shown in FIG. 12, the tool 77 is retracted away from the die and, with the punch 72 held frictionally in its forward or extended position by its tight engagement with the back-extruded portion of the blank, the sleeve 70 is driven forward to strip the almost completed blank from the die cavity and off the punch 72.

This is followed by the punching out of the web 88 from from the blank in a subsequent operation, and then the tapping of the central bore 87 in the blank (FIG. 13) to provide the screw threads on the nut.

The mechanism for controlling the positions and movements of the extrusion punch 72 and the sleeve 70 in the apparatus of FIGS. 9–12 may be basically similar to the mechanism shown in FIGS. 6–8 and already described in detail.

It will be apparent that this second embodiment of the present invention has the advantages already mentioned in the description of the first embodiment and which, therefore, need not be repeated. In addition, this second embodiment of the invention is characterized by deforming a solid cylindrical metal blank into its final externally hexagonal, hollow contour and dimensions in a single die in a novel and advantageous manner which requires only a single cycle of the machine.

It is to be understood that, while two presently-preferred embodiments of the invention have been described in detail and illustrated in the accompanying drawings, various modifications, omissions and adaptations differing from the disclosed embodiments may be adopted without departing from the spirit and scope of the present invention. For example, the extrusion punch in either embodiment may be blunt-ended instead of conical-ended, if desired. Also, in either embodiment the die cavity could be shaped to provide any desired polygonal or round shape on the finished article.

Having described my invention, I claim:

1. A method of making a hollow metal article which comprises the steps of: inserting a solid metal blank through an opening into a die cavity which snugly, but slidably, receives the blank and whose inner end is closed by a fixedly positioned sleeve having a snug sliding fit in the die and a fixedly positioned punch having a snug sliding fit in the sleeve whereby an inner end portion of the blank is adjacent the sleeve and punch and an outer end portion of the blank is adjacent to the opening to the die cavity; forcing the blank against said punch and thereby deforming the blank in a direction transverse to a central axis of the die cavity and into pressing engagement against a wall of the die cavity; and thereafter releasing said sleeve for movement in a direction away from the opening to the die cavity and driving said punch into the blank in a direction toward the opening to the die cavity while holding the outer end portion of the blank against movement, so as to back extrude the blank around said punch to retract said sleeve.

2. A method according to claim 1, and comprising the additional step of releasing the outer end portion of the blank and driving said sleeve in a direction toward the opening to the die cavity to strip the blank from the punch and the die cavity after the punch has been driven into the blank.

3. A method according to claim 1, wherein said step of deforming the blank includes the step of indenting the inner end portion of the blank against the punch while the latter is held fixedly positioned before being driven into the blank.

4. A method according to claim 1, and further comprising the step of upsetting the outer end portion of the blank in a direction transverse to a central axis of the die cavity while forcing the blank against the punch.

5. A method according to claim 4, wherein the outer end portion of the blank is upset by a tool having a laterally enlarged recess in an end portion of the tool which engages the outer end portion of the blank.

6. A method according to claim 4, wherein the outer end portion of the blank is upset into a laterally enlarged portion of the die cavity located adjacent to the opening to the die cavity.

7. A method according to claim 2, wherein during said inserting step the blank is snugly, but slidably, inserted into a polygonal portion of the die cavity, and then during said step of forcing the blank against the punch the blank is deformed into tight engagement with flats on said polygonal portion of the die cavity, and thereafter during said step of driving the punch into the blank further forcing the blank in a direction transverse to a central axis of the die cavity to completely fill the corners of said polygonal portion of the die cavity.

8. A method of making a hollow metal article with an enlarged laterally extending flange at one end which comprises the steps of: inserting a blank through an opening into a die cavity having at least a portion thereof shaped and dimensioned to snugly receive said blank and having its inner end closed by a sleeve which has a close sliding fit in the die and a punch which has a close sliding fit in the sleeve whereby an inner end portion of the blank is adjacent the sleeve and punch and an outer end portion of the blank is adjacent to the opening to the die cavity; while restraining said sleeve and said punch against movement, forcing against the outer end portion of said blank a tool which together with the die defines an annular recess immediately adjacent to the opening to the die cavity to form a head on the outer end portion of the blank; and thereafter, while holding said tool and die together and releasing the restraint on said sleeve, driving said punch into the blank in a direction toward the opening to the die cavity to cause the blank to extrude along the punch in a direction away from the opening to the die cavity and force said sleeve in a direction away from the opening to the die cavity.

9. A method of forming a flanged hollow metal article comprising the steps of: inserting a blank through an opening into a die cavity which snugly receives the blank with an outer end portion of the blank adjacent to the opening; closing the inner end of said die cavity which is spaced from the opening with a fixedly positioned sleeve which has a close sliding fit in the die and a fixedly positioned punch which has a close sliding fit in the sleeve and, while the inner end of the die cavity is thus closed, deforming the blank laterally against a wall of the die cavity and upsetting the outer end portion of the blank; thereafter, while fixedly holding the upset outer end portion of the blank to prevent the blank from moving out of the die cavity, driving the punch into the blank in the direction of the opening while releasing the sleeve for movement in a direction away from the opening so that the blank is extruded along the punch in the direction away from the opening and forces the sleeve to move in the direction away from the opening; and thereafter releasing the upset outer end portion of the blank and stripping the blank from the die cavity.

10. A method according to claim 9, and further comprising the step of indenting an inner end portion of the blank against an end of the punch during the upsetting of the outer end portion of the blank.

11. A method of forming a hollow metal article which is polygonal for at least a portion of its length comprising the steps of: inserting a solid round metal blank through an opening into a die cavity having a polygonal portion which snugly receives the blank and having its inner end spaced from the opening closed by a sleeve which has a close sliding fit in the die and a punch which has a close sliding fit in the sleeve and protrudes slightly beyond the sleeve; while restraining said sleeve and said punch against movement, forcing a tool against the outer end of the blank which is adjacent to the opening to force the inner end of the blank which is spaced from the opening against the protruding end of the punch to produce an indentation in the inner end of the blank and to force the blank laterally outward tightly against the flats of said polygonal portion of the die cavity; thereafter while fixedly holding the tool against the outer end of the blank to prevent the blank from moving out of the die cavity and with the restraint on the sleeve removed, driving the punch toward the opening to further force the blank laterally outward to completely fill the corners of said polygonal portion of the die cavity and to retract the sleeve by extruding the blank along the punch; and thereafter releasing the outer end of the blank and driving the sleeve toward the opening to strip the blank from the punch and the die cavity.

12. A method according to claim 11, wherein the step of forcing the blank tightly against the flats of said polygonal portion of the die cavity comprises driving into the outer end of the blank a tool having a central projection which forces the blank material laterally outward.

13. A method of forming a metal article having polygonal sides in a single die cavity, said method comprising the steps of: inserting a solid cylindrical metal blank through an opening into a die cavity having a polygonal portion which snugly receives the blank and having its inner end which is spaced from the opening closed by a sleeve which has a close sliding fit in the die and a punch which has a close sliding fit in the sleeve and has a front end protruding beyond the sleeve toward the opening, said blank being positioned in the die cavity with an outer end adajcent to the opening and an inner end adajcent to said sleeve and punch; while restraining said sleeve and said punch against rearward movement, driving against the outer end of the blank a tool having a central projection to provide a forcing of the blank material laterally outward tightly against the flats of said polygonal portion of the die cavity and a forcing of the inner end of the blank against the protruding front end of the punch to produce a centered depression in the inner end of the blank; thereafter, while fixedly holding said tool against the outer end of the blank to prevent the blank from moving out of the die cavity, driving the punch into the inner end of the blank in a direction toward the opening to further force the blank material laterally outward to completely fill the corners of said polygonal portion of the die cavity; and thereafter releasing the outer end of the blank and stripping the blank from the die cavity.

14. A method according to claim 13, and further comprising the step of releasing said sleeve for movement in a direction away from the opening while the punch is driven forward, so that the blank material extruding rearward along the punch can force said sleeve rearward.

15. A method according to claim 14, wherein the blank is stripped from the die cavity by driving said sleeve forward while the punch is in its extended forward position.

16. Apparatus for forming a hollow metal article comprising a tool, a die having a die cavity with at least a portion thereof shaped and dimensioned to snugly receive a blank, said die cavity having an opening with an outer end portion of the blank disposed adjacent to the opening and an inner end portion of the blank spaced from the opening, means for moving said tool and die together and apart, a sleeve snugly but slidably disposed in the die at an inner end of the die cavity, an extrusion punch snugly but slidably disposed in said sleeve, means for fixedly holding said sleeve and said punch at the inner end of the die cavity while said tool and die are brought together so as to back up the inner end portion of the blank and to deform the blank laterally outward into engagement with walls defining the die cavity, and means operable after said tool and die are brought together for driving said punch in a direction toward the opening and into the blank while holding said tool and die together and at the same time releasing the sleeve for movement rearwardly under the influence of blank material extruded rearwardly along the punch.

17. Apparatus according to claim 16, wherein said punch has an end protruding slightly beyond the end of the sleeve in a direction toward the opening to the die cavity when the sleeve and the punch are fixedly held at the inner end of the die cavity to produce a centering depression in the inner end portion of the blank.

18. Apparatus according to claim 16, and wherein said means for driving said punch into the blank includes means for selectively adjusting the distance which the punch is moved toward the opening to thereby vary the extent to which the punch penetrates the blank, said apparatus further comprising means for driving said sleeve forward, following the forward stroke of the punch and after the tool and die are separated, to strip the blank from the punch and out of the die cavity.

19. Apparatus according to claim 18, wherein said punch has its front end protruding slightly beyond the sleeve in the direction of the opening to the die cavity while the sleeve and the punch are fixedly held at the inner end of the die cavity to produce an indentation in the inner end of the blank as the tool and die are brought together.

20. Apparatus according to claim 18, wherein there is provided a pivoted rocker arm coupled to the punch, means for normally positioning said rocker arm in one limit position to hold the punch retracted at the inner end of the cavity, means for displacing said rocker arm away from said one limit position to drive the punch in a direction toward the opening to the die cavity after the tool and die are brought together, and means for limiting the displacement of the rocker arm away from said one limit position to thereby determine the position of the punch at the completion of its stroke toward the opening.

References Cited

UNITED STATES PATENTS

| | | | |
|---|---|---|---|
| 2,715,232 | 8/1955 | Egan | 10—11 |
| 2,667,650 | 2/1954 | Freidman | 10—27 |
| 3,126,561 | 3/1964 | Orloff | 10—27 |
| 3,186,209 | 6/1965 | Freidman | 10—27 |
| 2,395,721 | 2/1946 | Buchet | 10—11 |
| 3,417,597 | 12/1968 | Napoli | 72—256 X |

CHARLES W. LANHAM, Primary Examiner

A. L. HAVIS, Assistant Examiner

U.S. Cl. X.R.

10—11, 27, 86